US006778735B2

(12) United States Patent
Miller et al.

(10) Patent No.: US 6,778,735 B2
(45) Date of Patent: Aug. 17, 2004

(54) TUNABLE FIBER BRAGG GRATINGS

(75) Inventors: Calvin M. Miller, Naples, FL (US); Mark Lehi Jones, Atlanta, GA (US); Kevin Hsu, Roswell, GA (US); Phil Santangelo, Winder, GA (US)

(73) Assignee: Micron Optics, Inc., Atlanta, GA (US)

( * ) Notice: Subject to any disclaimer, the term of this patent is extended or adjusted under 35 U.S.C. 154(b) by 118 days.

(21) Appl. No.: 10/101,449

(22) Filed: Mar. 19, 2002

(65) Prior Publication Data

US 2002/0131709 A1 Sep. 19, 2002

Related U.S. Application Data

(60) Provisional application No. 60/277,220, filed on Mar. 19, 2001.

(51) Int. Cl.[7] .................................................. G02B 6/34
(52) U.S. Cl. ......................................................... 385/37
(58) Field of Search .......................................... 385/37

(56) References Cited

U.S. PATENT DOCUMENTS

| | | | | |
|---|---|---|---|---|
| 5,007,705 A | | 4/1991 | Morey et al. | 350/96.29 |
| 5,042,898 A | | 8/1991 | Morey et al. | 385/37 |
| 5,367,589 A | | 11/1994 | MacDonald et al. | 385/37 |
| 5,469,520 A | | 11/1995 | Morey et al. | 385/37 |
| 5,602,949 A | | 2/1997 | Epworth | 385/37 |
| 5,694,501 A | * | 12/1997 | Alavie et al. | 385/37 |
| 5,694,503 A | | 12/1997 | Fleming et al. | 385/37 |
| 5,774,619 A | * | 6/1998 | Bruesselbach | 385/137 |
| 5,841,920 A | | 11/1998 | Lemaire et al. | 385/37 |

(List continued on next page.)

FOREIGN PATENT DOCUMENTS

| | | |
|---|---|---|
| WO | WO 98/17968 | 4/1998 |
| WO | WO 98/27446 | 6/1998 |
| WO | WO 00/07047 | 2/2000 |
| WO | WO 00/39617 | 7/2000 |

OTHER PUBLICATIONS

Ball and Morey (Dec. 1994), "Compression–tuned single–frequency Bragg grating fiber laser," Opt. Lett. 19(23): 1979–1981.
Hill and Meltz (Aug. 1997), "Fiber Bragg grating technology fundamentals and overview," J. Lightwave Technology 15(8): 1263–1276.
Iocco et al. (Sep. 1998), "Tension and compression tuned Bragg grating filter," Proc. ECOC '98, vol. 1: 229–230.
Iocco et al. (Jul. 1999), "Bragg grating fast tunable filter for wavelength division multiplexing," J. Lightwave Technology 17(7): 1217–1221.

*Primary Examiner*—Akm Enayet Ullah
*Assistant Examiner*—Mike Stahl
(74) *Attorney, Agent, or Firm*—Greenlee, Winner and Sullivan, P.C.

(57) ABSTRACT

The invention relates to devices and methods for tuning a fiber grating. A fiber containing a fiber grating is uniformly, precisely and reproducibly bent by first embedding the fiber in a substrate or mounting the fiber on a substrate parallel to the longitudinal (long) axis of the substrate and applying appropriate force to bend the substrate perpendicular to the length of the fiber, i.e., perpendicular to the longitudinal axis of the substrate. Embedding of the fiber carrying the fiber grating parallel to, but offset from the plane containing the central axis which is normal to the bend of the substrate allows bending of the substrate along that central axis of the substrate to achieve enhanced fiber compression or stretching. The fiber grating is tuned preferably by application of force to the substrate to bend the substrate such that the radius of the bend uniformly increases or decreases at least along the length of the fiber grating in the substrate. In specific embodiments the substrate of this invention is bent by changing the diameter of a cylinder, loop or ring to which the substrate is directly or indirectly attached.

18 Claims, 10 Drawing Sheets

U.S. PATENT DOCUMENTS

| | | | |
|---|---|---|---|
| 5,892,582 A | 4/1999 | Bao et al. | 356/345 |
| 5,978,539 A | 11/1999 | Davies et al. | 385/129 |
| 5,991,483 A | 11/1999 | Engelberth | 385/37 |
| 5,999,671 A | 12/1999 | Jin et al. | 385/37 |
| 6,044,189 A | 3/2000 | Miller | 385/37 |
| 6,115,122 A | 9/2000 | Bao et al. | 356/345 |
| 6,181,851 B1 | 1/2001 | Pan et al. | 385/37 |
| 6,229,827 B1 | 5/2001 | Fernald et al. | 372/112 |
| 6,240,220 B1 | 5/2001 | Pan et al. | 385/13 |
| 6,327,036 B1 | 12/2001 | Bao et al. | 356/480 |
| 6,360,042 B1 * | 3/2002 | Long | 385/37 |
| 6,366,721 B1 * | 4/2002 | Hu et al. | 385/37 |
| 6,556,726 B2 * | 4/2003 | Yang et al. | 385/2 |
| 2003/0012499 A1 * | 1/2003 | Mendez et al. | 385/37 |

* cited by examiner

TUNABLE FIBER BRAGG GRATINGS

CROSS-REFERENCE TO RELATED APPLICATIONS

This application takes priority under 35 U.S.C. 119(e) from U.S. provisional application 60/277,220, filed Mar. 19, 2001, which is incorporated by reference herein in its entirety.

BACKGROUND OF THE INVENTION

Fiber Bragg Gratings (FBG) are widely used in various optical sensing and communications applications. FBG, prepared by well-known methods, reflect a selected design wavelength transmitting input light with a notch at the design wavelength. There is significant interest in devices that will reliably allow the reflection wavelength of an FBG to be tuned. While it has been recognized that the reflection wavelength of an FBG can be tuned by stretching or compressing the waveguide (typically an optical fiber) in which the FBG is written, mechanical methods that have been applied to this problem most often result in devices with relatively narrow tuning ranges or when wider tuning is attempted in frequent fiber breakage. These methods have generally not been practical in application.

U.S. Pat. No. 5,007,705 relates generally to methods for tuning fiber Bragg gratings by temperature change, electro-mechanical stretching or by application of fiber coatings that are sensitive to modulating electrical, magnetic or acoustic fields. In a specific example, tuning is reported to be achieved by winding a fiber containing a Bragg grating around the circumference of a piezoelectric cylinder. The circumference of the cylinder expands on application of a voltage, the fiber is stretched and the wavelength of the Bragg grating is changed.

U.S. Pat. No. 5,469,520 reports tuning of a Bragg grating up to 45 nm by compression of the fiber carrying the grating using a moving piston actuated by a stepping motor. The fiber is retained in sliding ferrules to minimize fiber buckling. U.S. Pat. No. 6,229,827 also reports tuning of a fiber grating by compression of the fiber. The fiber containing the grating is encased in glass to form a tunable element which is axially (along the fiber axis) compressed. Encasing the fiber in glass is described as preventing buckling on compression. WO 00/39617 relates to a tube-encased fiber grating.

U.S. Pat. No. 6,240,220 and International Application WO/00/07047 report tuning of fiber gratings by varying longitudinal displacement of a support member supporting a fiber carrying the grating to uniformly stretch the fiber. In a specific example, a convex fiber support member having a channel on that surface for receiving the fiber is illustrated. The fiber support member in this example is displaced normal to a portion of the fiber in the channel. U.S. Pat. Nos. 5,999,671; 5,991,483; 5,841,920; 5,602,949 and 5,367,589 also relate to tuning of fiber gratings.

Various methods have been employed to temperature-compensate fiber gratings. U.S. Pat. No. 6,044,189, for example, describes a temperature compensation structure to which the fiber carrying the grating is bonded. The structure has two plates made of materials having temperature coefficients of expansion and the fiber is bonded to the external surface of the plate having the lower temperature coefficient. The structure bends with temperature change and elongates the fiber as temperature decreases. U.S. Pat. Nos. 6,181,851; 5,042,898; 5,978,539; and 5,694,503 also relate to temperature compensation of fiber gratings.

SUMMARY OF THE INVENTION

The present invention relates to devices and methods for tuning fiber gratings by bending the fiber containing a fiber grating. A desirable wavelength tuning range of about 50 nm can be achieved, for example, by compressing a fiber by about 5%. In principle, this amount of compression can be achieved by bending a fiber along its axis, however, transverse forces that would accompany mechanical bending must be minimized or the fiber will break. This invention provides devices and methods for tuning the reflection wavelength of fiber gratings to achieve a desirable tuning range while minimizing fiber breakage.

A fiber containing a fiber grating is uniformly, precisely and reproducibly bent by embedding the fiber in a substrate or mounting the fiber on a substrate parallel to the longitudinal (long) axis of the substrate and applying appropriate force to bend the substrate perpendicular to the length of the fiber, i.e., perpendicular to the longitudinal axis of the substrate. Further, embedding of the fiber carrying the fiber grating parallel to, but offset from the plane containing the central axis which is normal to the bend of the substrate allows bending of the substrate along that central axis of the substrate to achieve enhanced fiber compression or stretching dependent upon the direction of bending of the substrate relative to the direction the fiber is offset from the central axis.

The substrate in which the fiber is encased or embedded must be sufficiently wider than the fiber (the substrate width is much greater than the fiber diameter) so that bending of the substrate uniformly compresses or stretches the fiber. The substrate must also be sufficiently elastic and resilient that it can be repeatedly bent without being deformed, returning to its original unbent shape when bending forces are removed. Sufficient elasticity can be achieved by choice of material and material thickness.

In specific embodiments, the fiber is embedded in a substrate offset in thickness (the smallest dimension of a rectangular substrate) from the central longitudinal axis of the substrate. The substrate can be formed of a single component or uniform mixture of components or it can be formed from two or more layers or a laminate of the same or different materials.

In other specific embodiments, the fiber is mounted on a substrate surface by application of a layer of adhesive which bonds the fiber at least along the length of the fiber grating to the substrate surface. The substrate itself in this embodiment may be composed of a single layer or multiple layers of different materials.

The present invention is directed to substrates containing one or more fibers carrying fiber gratings, particularly to fibers carrying FBGs, wherein the fiber is offset from the plane of containing the central axis of the substrate that is normal to the bend. The invention is also directed to fiber grating tuning devices in which the substrate carrying the offset fiber is bent with a substantially uniform radius over substantially the entire length of the fiber grating. The invention is further directed to optical devices which employ the tuning devices of this invention and to methods of tuning the wavelength of an fiber grating (particularly a fiber Bragg grating) using the bending procedure, the substrate or the tuning devices of this invention.

More specifically, the invention relates to a fiber grating tuning device in which an optical fiber carrying a fiber grating is longitudinally mounted upon or longitudinally embedded within the substrate such that the fiber axis is offset from the plane of the substrate that contains the central longitudinal axis of the substrate and which is normal to bend that is to be applied. The substrate will normally be bent normal to its length and parallel to its smallest dimension (its thickness). The geometry of the bend and its relationship to the offset is illustrated in FIGS. 1A–1K herein. The tuning device also contains an actuator for application of force to the substrate to bend it perpendicular (or normal) to the longitudinal axis of the substrate.

The substrate of the tuning device can comprises two or more layers of different materials wherein the fiber carrying the fiber grating is embedded between any two layers of the substrate. In this configuration the fiber may be embedded within the substrate within a layer of adhesive. The tuning device can comprise a fiber mounted lengthwise (longitudinally) upon a surface of the substrate in an adhesive layer.

In specific embodiments of this invention the substrate is bent by mounting the substrate directly or indirectly on the surface of a cylinder, loop or ring and changing the diameter of the loop or cylinder to bend the substrate. The cylinder, loop or ring functions to convert force applied to it to change its diameter to bend the substrate. A specific actuator comprises a loop made of resilient material having two ends wherein the diameter of the loop is changed by application of force (pulling or pushing) to one or both ends of the loop. In this specific embodiment the substrate can be mounted on an outside surface or an inside surface of the loop. In another specific embodiment, the actuator is a cylindrical piezoelectric transducer upon which the substrate is mounted and which changes its diameter on application of a voltage to the piezoelectric transducer. In yet another specific embodiment, the actuator comprises a cylinder upon which the substrate is mounted in a relaxed or unbent state such that the substrate longitudinal axis is parallel to the longitudinal axis of the cylinder and wherein a uniform bend is applied to the substrate by winding the substrate around the cylinder. Winding can be achieved in this embodiment, for example, by bonding the substrate to a winding strip attached at either longitudinal end to moveable elements which can be rotated around the cylinder. The winding strip and the substrate mounted upon it is wound around the cylinder by rotating the moveable elements in opposite directions relative to each other around the cylinder.

The invention also relates to a method for tuning a fiber grating employing the tuning devices of this invention. More generally the method involves applying force to a substrate of this invention which carries a fiber and a fiber grating to bend the substrate perpendicular to longitudinal axis of the substrate and parallel to the direction the fiber axis is offset from the central longitudinal axis of the substrate. The bend is preferably applied to the substrate such that the radius of the bend uniformly increases or decreases at least along the length of the fiber grating in the substrate. In specific embodiments the substrate of this invention is bent by changing the diameter of a cylinder, loop or ring to which the substrate is directly or indirectly attached.

The invention is further illustrated and exemplified in the following description and drawings in which similar features are identified by like numbers.

BRIEF DESCRIPTION OF THE DRAWINGS

FIGS. 1A–C illustrate a layered substrate for embedding a fiber carrying a fiber grating which allows bending of the fiber while minimizing fiber buckling and fiber breakage.

FIGS. 1F and G illustrate a substrate of this invention formed by bonding a fiber carrying a grating to a surface of a substrate with a layer of adhesive.

FIGS. 1H and I illustrate a multiple layer substrate of this invention. The fiber is embedded in an adhesive layer on a substrate formed by combining two layers of different materials.

FIGS. 1J and K illustrates another substrate configuration of this invention.

DETAILED DESCRIPTION OF THE INVENTION

Figure 1A:
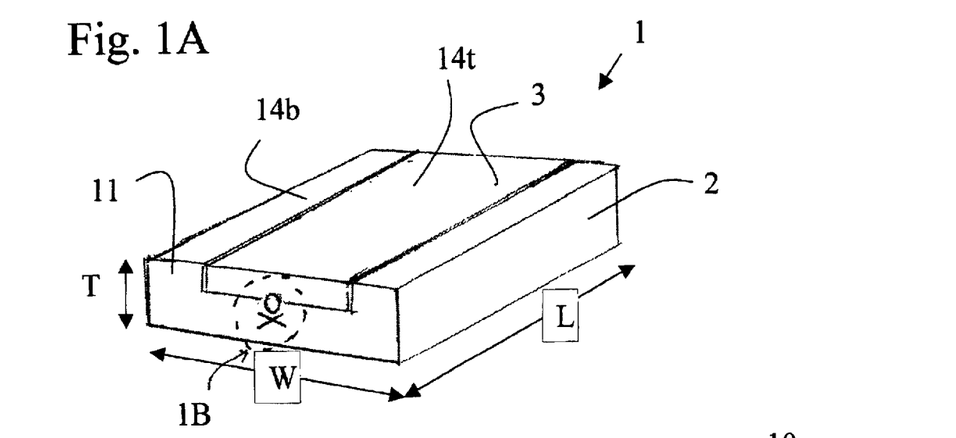
FIG. 1A is a perspective view of the layered substrate.
Figure 1B:
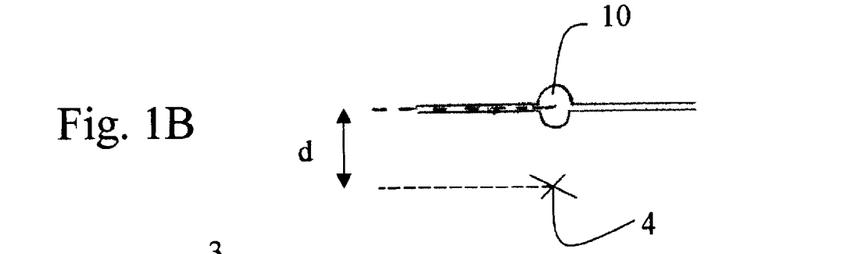
FIG. 1B is an expanded view of the fiber cavity formed when the top and bottom substrates are aligned.
Figure 1C:
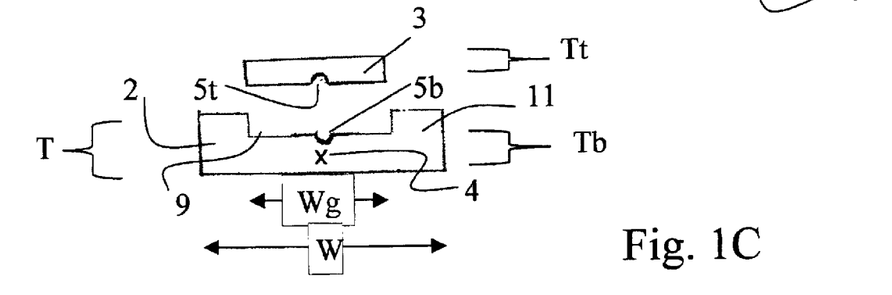
FIG. 1C is an end view of the exploded layered substrate.

FIGS. 1A–C illustrate a substrate design for minimizing or avoiding transverse forces on a fiber during bending. The substrate 1 consists of two layers, a bottom layer 2 and a top layer 3, (the designations top and bottom simply refer to the illustration of the layers in the figures) which have different thicknesses (Tt=top layer thickness and Tb=bottom layer thickness) to achieve fiber offset (d) from the central axis 4 of the substrate. The substrate is sufficiently long (L=substrate length) to embed the fiber at least over the entire length of the fiber grating. For example, 3 inch (about 7.5 cm) long strips of material can be employed for standard FBGs which range in length from several mm to about 5 cm). The substrate width (W) is much larger than the diameter of the fiber (2.5 mil fiber is typically used). The bottom and top layers have at least one precisely machined channel, 5b or 5t, respectively, along their length for closely receiving a fiber. The channels are preferable semi-circular for receiving fibers. The bottom layer has a precisely machined rectangular groove 9 of width Wg along its length which is sized and shaped (L×Wg) for closely receiving the top layer with top and bottom channels, e.g., 5b and 5t, precisely aligned when the bottom layer is received within the groove. When the top layer is in place in the groove of the bottom layer (9), at least one precisely sized cylindrical cavity 10 for receiving a fiber carrying a fiber grating extends the length of the substrate (5b and 5t combined) is formed. When a single fiber cavity is formed, it is preferably centered along the width (W) of the substrate, but offset by d from the center of the combined thickness T of the two layer substrate. A vector perpendicular to both the fiber axis and the longitudinal axis of the substrate extending from the longitudinal axis to the fiber axis defines the direction of offset of the fiber axis from the substrate axis. The ridges 11 along the length of the layered substrate are intended to hold the top layer (3) precisely in alignment with the bottom layer (2) and to precisely align fiber cavity 10 during assembly of the tuning device. The top surface 14*t* of the top layer is preferably flush with the top surface 14*b* of the ridges of the bottom layer (the thickness of the top layer matches the depth of groove 9).

Figure 1D:
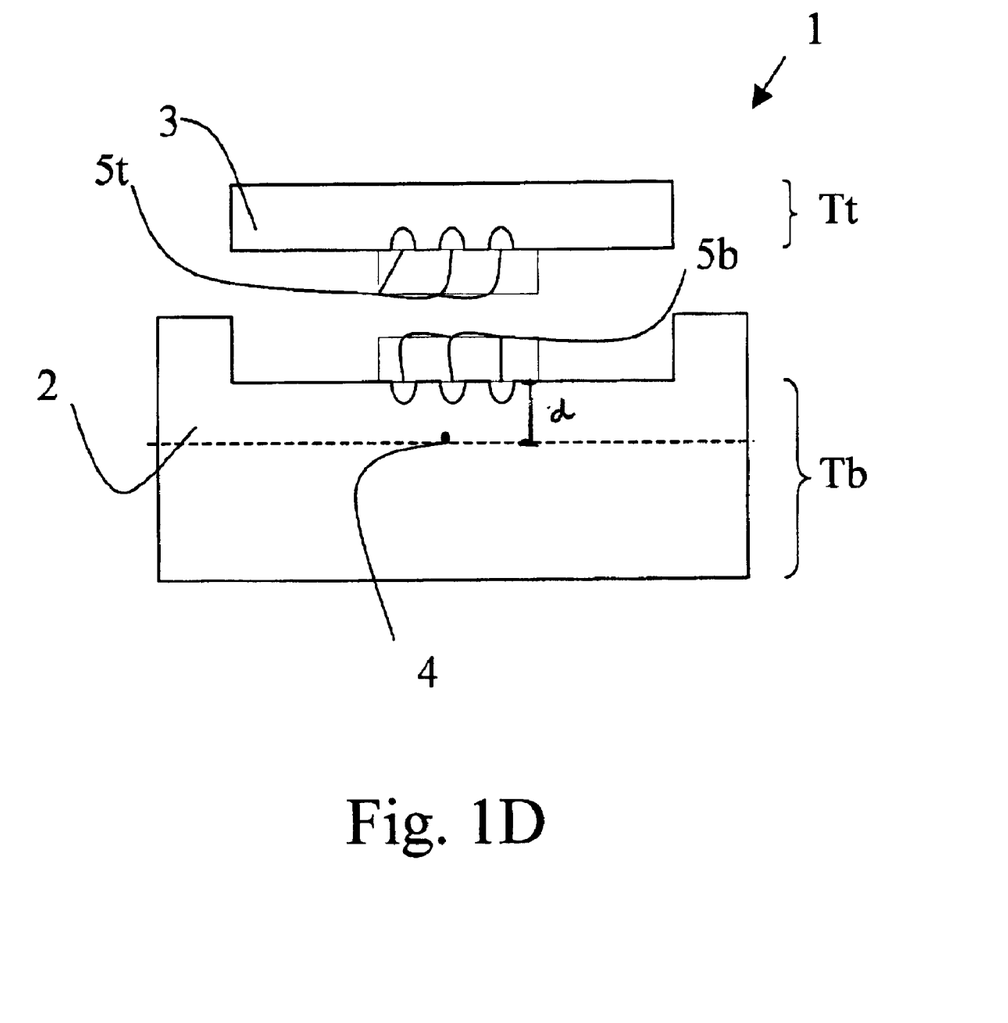
FIG. 1D illustrates an end view of layered substrate of this invention which is designed to receive more than one fiber carrying a fiber grating.

A substrate (1) formed for receiving more than one fiber is illustrated in FIG. 1D. Preferably the embedded or encased fibers will generally be positioned toward the center of the width of the substrate. Where a fiber is embedded off the center of the width of the substrate, the offset of the fiber can be described as the distance that the fiber is from a plane containing the longitudinal axis parallel to the top or bottom surface of the substrate as illustrated. Each fiber may be offset the same distance from this plane (as illustrated in FIG. 1D) or at different distances from this plane. The substrate is bent parallel or antiparallel to the direction of offset of the fiber from the plane containing the longitudinal axis of the substrate (the bend in the substrate is normal to top and bottom surface of the substrate as illustrated).

The top and bottom layers of the substrate can be made of the same materials or different materials. The substrate layers can be made of thin metal strips (Cu, Al, stainless steel, spring steel, etc.) with thickness in the range of tens of thousandths of an inch (e.g., about 10/1000–50/1000). One or both substrate layers can be made of plastic or other elastic and resilient materials. The substrate materials must have physical properties such that the bending forces applied to it are conveyed to the fiber embedded in the cavity in the substrate.

The channels for receiving the fiber are precisely machined to accommodate the fiber and a thin layer of adhesive sufficient to bond the fiber within the fiber cavity that is formed on assembly of the substrate. The precise machining of the channel and precise alignment of the top and bottom channels to form the fiber cavity provides for precise alignment of the fiber in the substrate and minimizes or prevents the generation of transverse forces on the fiber during bending which decreases the frequency of fiber breakage and increases the practical lifetime of the tuning device.

A layered or laminated substrate (e.g., 1) is assembled by applying a very thin layer of appropriate adhesive on the surfaces of the groove and the fiber channel(s), one or more fibers are positioned in the fiber channel(s) and the top layer is inserted into the groove. An appropriate adhesive is UV or heat curable epoxy. The fiber is bonded in the fiber cavity of the substrate at least along the entire length of the fiber grating.

Figure 1E:
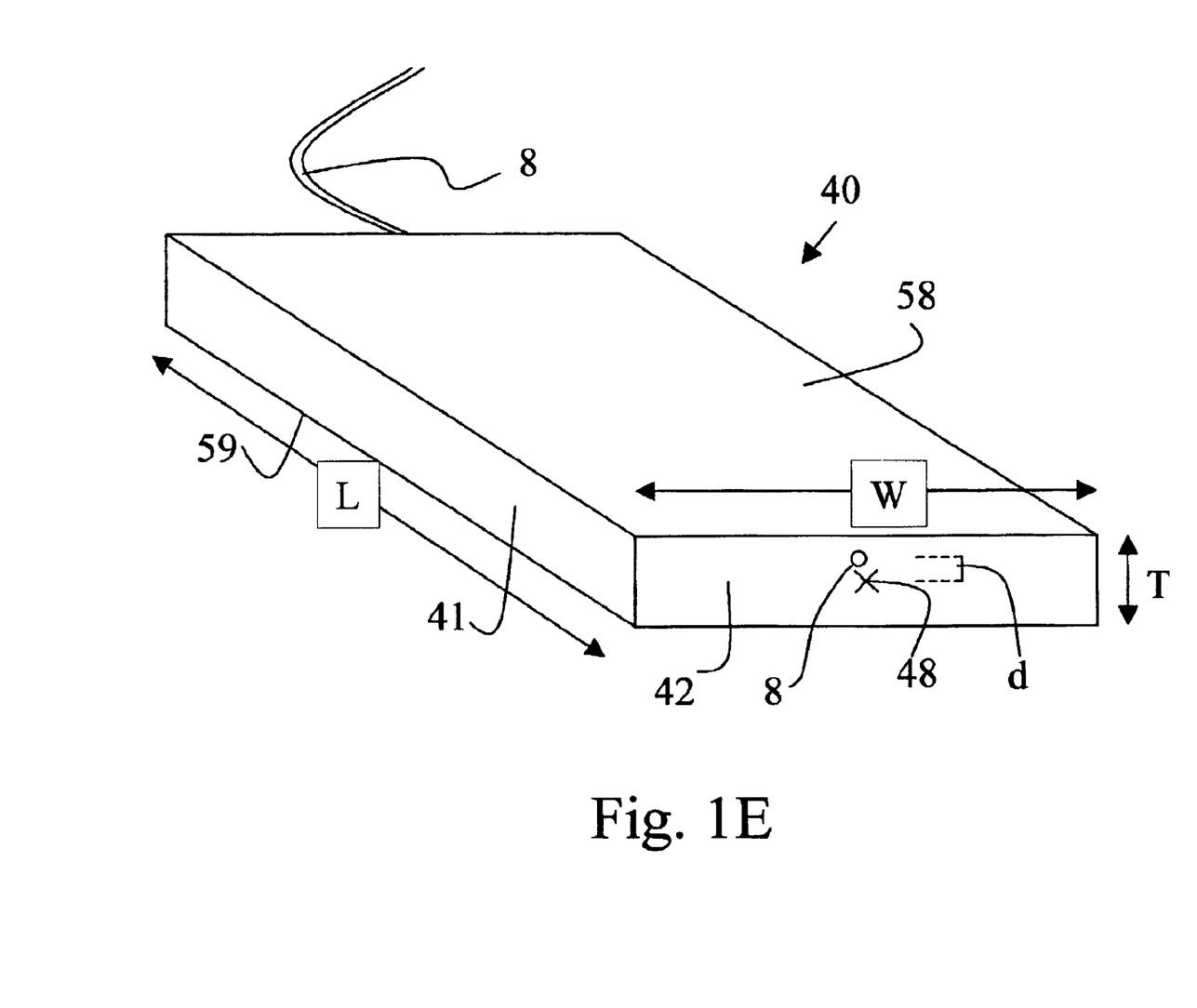
FIG. 1E illustrates a fiber carrying a fiber grating embedded in a substrate formed from a single component or a uniform mixture of components (non-layered substrate).
Figure 1F:
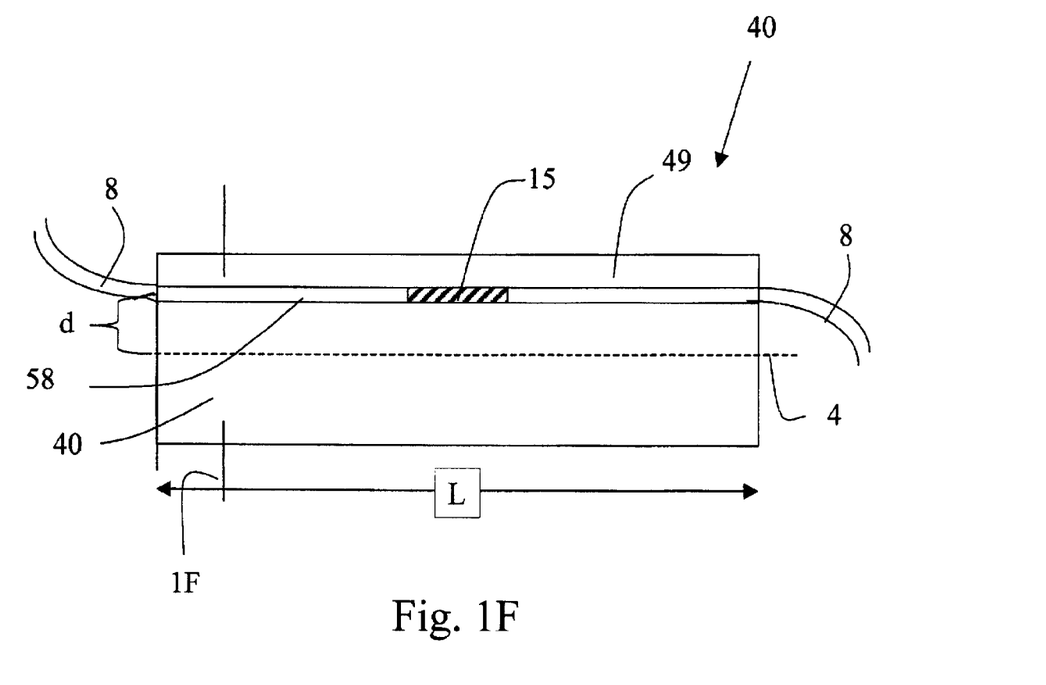
FIG. 1F is a longitudinal cross-section of the substrate illustrating the fiber on the substrate in the adhesive layer and FIG. 1G is an end view of the substrate.
Figure 1G:
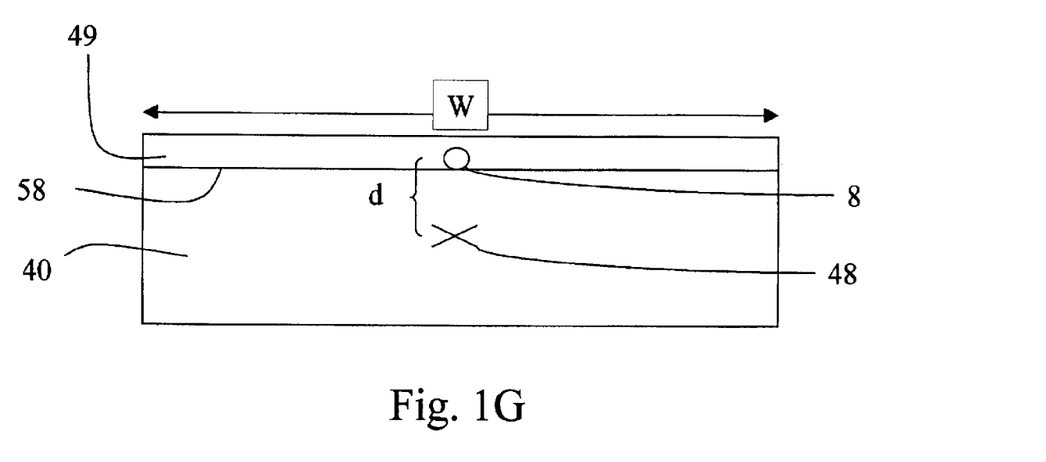
Figure 1H:
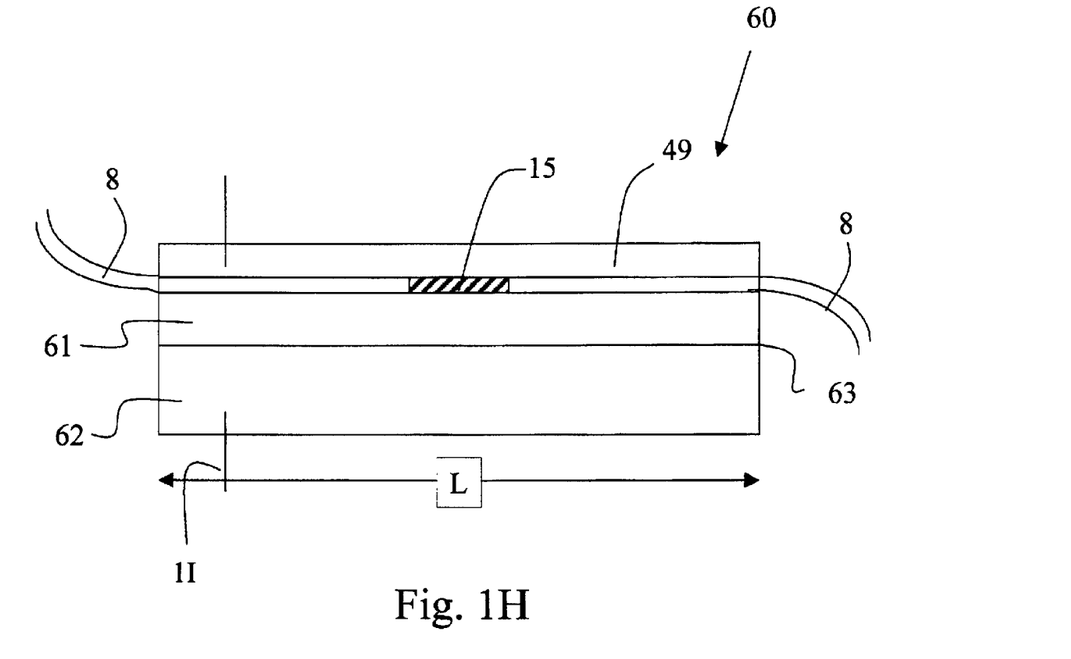
FIG. 1H is a longitudinal cross-section of the substrate illustrating the embedded fiber.
Figure 1I:
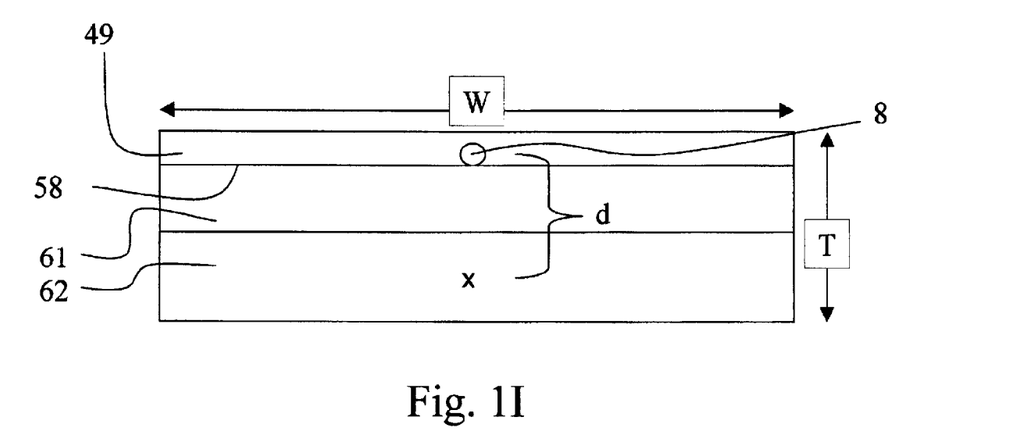
FIG. 1I is an end view of the substrate.
Figure 1J:
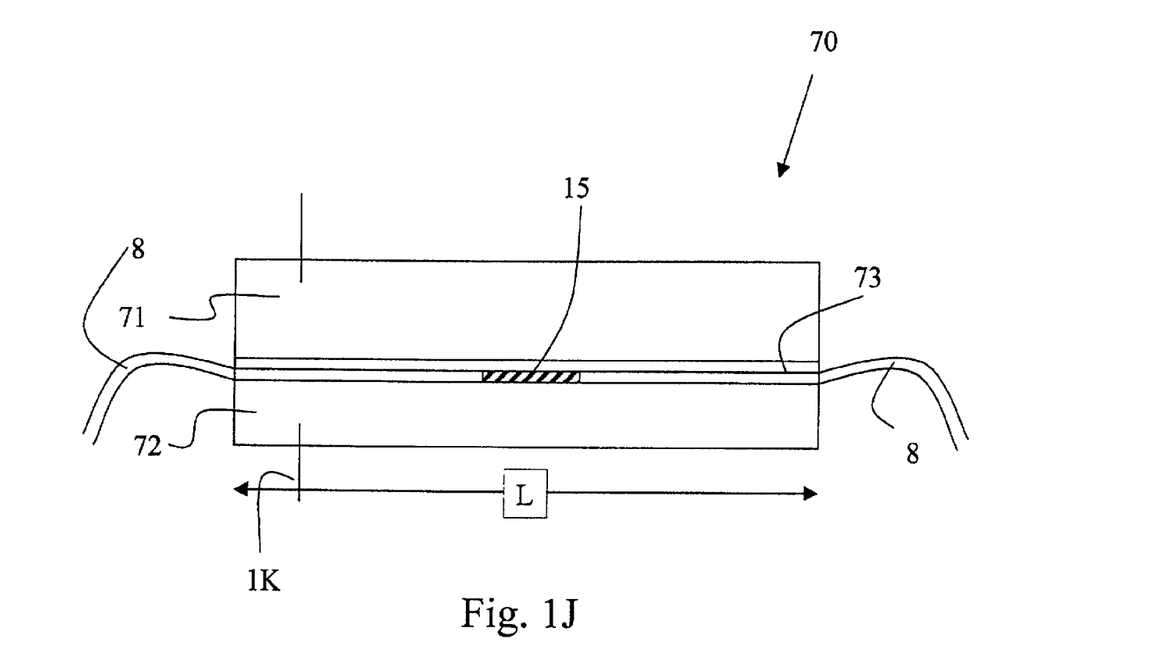
FIG. 1J is a longitudinal cross-section of the substrate illustrating the embedded fiber.

FIGS. 1E–1K illustrate other substrate designs for use in tunable fiber gratings. FIG. 1E illustrates the off-axis positioning of the waveguide (optical fiber) in a plate-shaped (broader and longer than it is thick) substrate. FIGS. 1F and G illustrate a tuning device of this invention with a waveguide bonded to the top (mounting surface) of a substrate. Bending of the substrate (dependent upon the direction of bending) compresses or stretches the waveguide and tunes the FBG. FIGS. 1H and I illustrate a tuning device of this invention with a waveguide bonded to the top of a multiple layer substrate. FIGS. 1J and K illustrate a tuning device of this invention with a waveguide embedded between two layers of different materials (a composite layered substrate).

FIG. 1E is a schematic illustration of a tuning device of this invention in which an optical fiber (8) containing a fiber grating (15) is embedded (or layered) within a bendable substrate (40). In the illustrated device the optical grating is positioned off the central axis of the substrate. The substrate (40) is plate-shaped being wider (W) and typically longer (L), than it is thick (T) and the optical fiber is embedded along the length of the substrate. The substrate has top (58) and bottom (59) surfaces and sides (41 and 42) where 41 is the long side. In the illustrated device, the optical fiber is displaced by a distance d from the central axis (48) toward one surface (designated the top surface (58) for reference) of the substrate. Since the optical fiber is positioned asymmetrically within the substrate, bending the substrate toward the fiber compresses the fiber and bending in the other direction stretches the fiber. More specifically, if the substrate is bent in the direction of offset of the fiber from the longitudinal axis of the substrate the fiber is compressed. If the substrate is bent away from the direction of offset of the fiber from the longitudinal axis of the substrate the fiber is stretched.

FIGS. 1F and G illustrate another embodiment of a tunable FBG of this invention. In this case, the optical fiber carrying the fiber grating (8) is bonded to the mounting surface (designated the top surface 58 here) of the substrate (40) using an adhesive layer (49). The adhesive should be flexible yet strong to avoid cracking and breakage. Epoxies can be employed as the adhesive. Adhesives employed for strain gauge attachment applications can be employed as well.

In this embodiment, the substrate can be made of a single component (or a uniform mixture of components) or can be a composite substrate formed of different layers of different materials. For example, as illustrated in FIGS. 1H and I, the substrate (60) can be composed on a first (top) layer of a first substrate material (61) and a second (bottom) layer (62) of a second substrate material. Again the optical fiber is bonded to the top layer of the composite substrate using adhesive. The substrate material layers in this embodiment can be bonded to each other using any adhesive (63) or bonding material that will provide sufficient strength to maintain the bond, yet allow bending of the waveguide along with the composite substrate. For example, the layers of substrate material can be bonded using a strain gauge adhesive as noted above.

In a specific example of the embodiment of the device of FIGS. 1F and G, the first substrate is made of a material of thickness t(1) having a first Young's modulus (YM(1)) and the second substrate is made of a material of thickness t(2) having a second YM, (YM(2)) and YM(1) is much less than YM(2). For example, YM(1) is 10 to 100 times or more lower than YM(2). In general in a device having two layers of substrate material the top layer is preferably composed of a relatively elastic material having a YM below 10 Gpa and the bottom layer is preferably composed of a material having a significantly higher YM greater than about 100 Gpa.

Figure 1K:
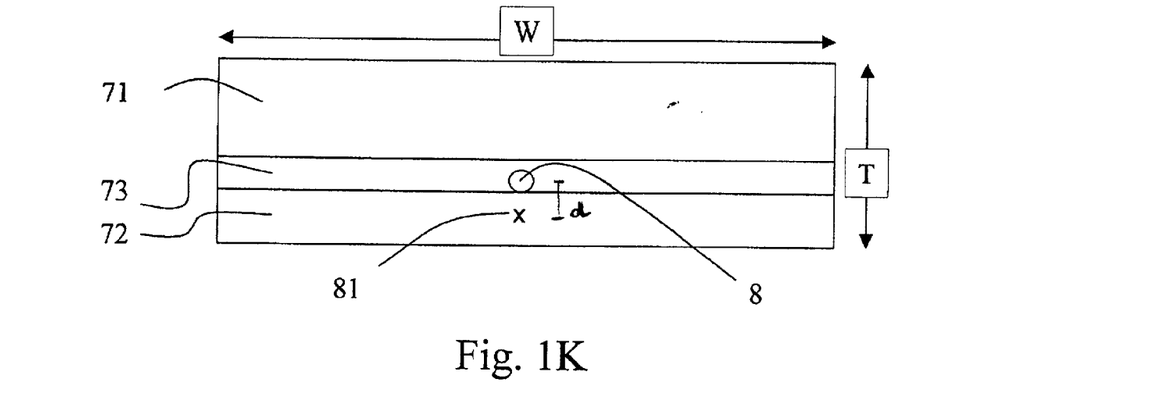
FIG. 1K is an end view of the substrate.

FIGS. 1J and K illustrate another embodiment of the tuning device of this invention in which a waveguide (optical fiber) 8 with an FBG 15 is embedded between layers of substrate material. The substrate 70 has a first (top) layer 71 and a second (bottom) layer 72. The optical fiber is bonded between the first and second layers by adhesive 73. As discussed for FIGS. 1H and I, the first layer has YM(1) and thickness t(1) and the second layer has YM(2) and thickness t(2). The fiber is displaced from the central axis of the bottom layer 81 (which has the higher Youngs Modulus)

In general, composite substrates useful in this invention can have two or more layers of substrate material bonded to each other typically through thin layers of appropriate adhesive. A multilayer substrate can for example have one or more intermediate layers between the top and bottom layers. In preferred embodiments the material of the layers and the thicknesses of the layers are selected so that the YM of the layers increases from the top layer to the bottom layer and so that the thicknesses of the layers decrease from the top layer to the bottom layer. The overall thickness and material of the layers being selected so that the composite substrate remains bendable (elastic) and resilient.

Figure 2:
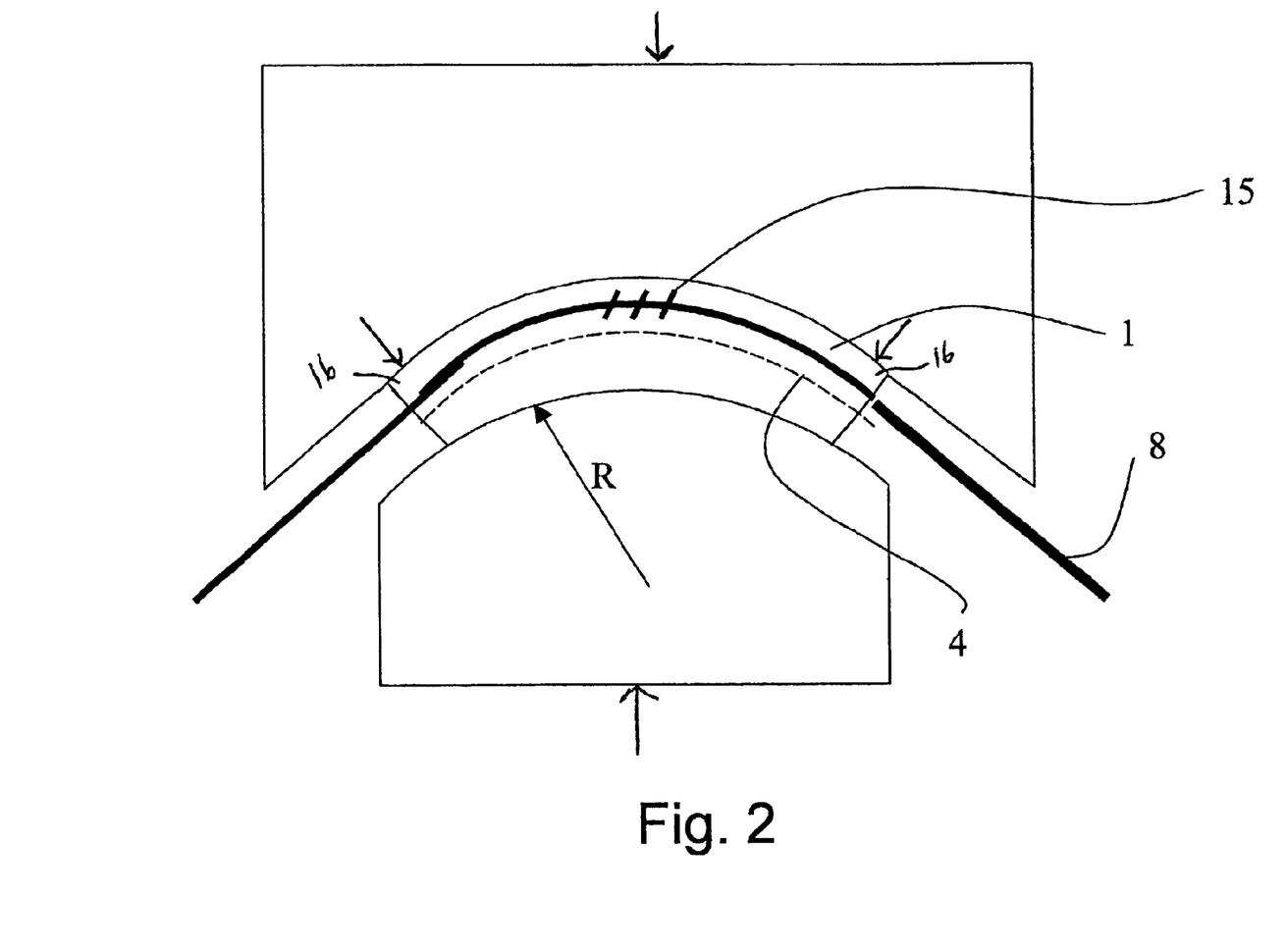
FIG. 2 illustrates the bending of a fiber carrying a fiber grating encased or embedded in a substrate.

Bending of a fiber (8) carrying a fiber grating (15) and encased or embedded in a substrate (1) of this invention is schematically illustrated in FIG. 2. The fiber grating 15 (e.g., an FBG) is tuned by applying uniform bending forces (illustrated by arrows) to the substrate 1 to bend the substrate perpendicular to its central longitudinal axis 4 which in turn uniformly bends the fiber along its length. For example, the bending forces can be applied normal to the central axis of the substrate and normal to the axis of the fiber. Alternatively, forces can be applied at the ends (16) of the substrate to generate the bend. Preferably the substrate is bent such that the radius (R) of the bend is substantially constant. In FIG. 2 the substrate is bent away from the direction of offset of the fiber (8) from the longitudinal axis of the substrate (4) so that the fiber is stretched on bending.

Those of ordinary skill in the art will appreciate that the desired bending forces can be applied to the substrate in a variety of ways. Two examples of devices for application of the desired uniform bending are illustrated in FIGS. 3A and 3B and 4A and 4B. In these devices the radius of the bend applied to the fiber is increased or decreased substantially uniformly over the length of the fiber grating.

Figure 3A:
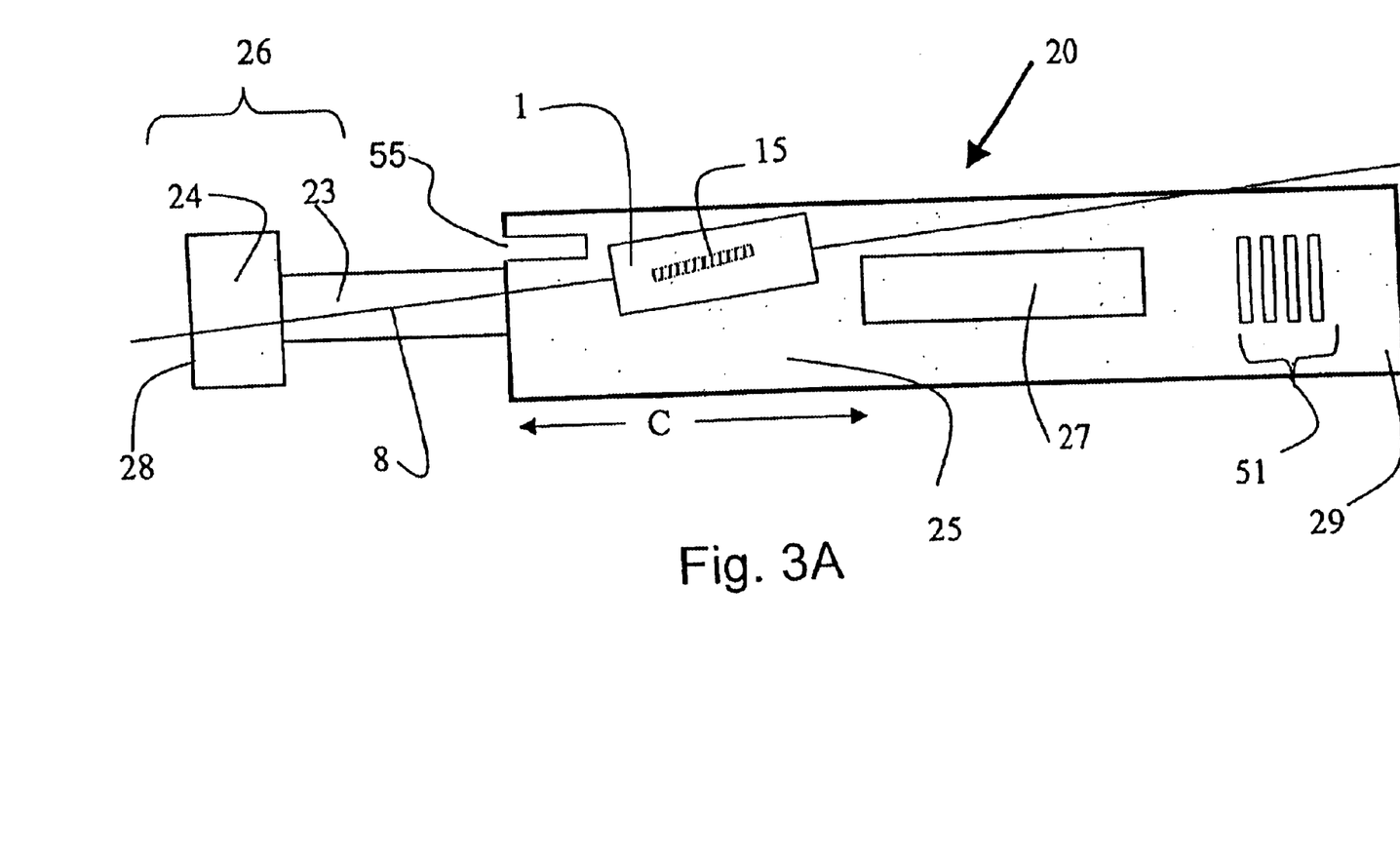
FIGS. 3A and 3B illustrate a loop device for applying a uniform bend with substantially constant R along the fiber grating length to a layered substrate with embedded FGB.
Figure 3B:
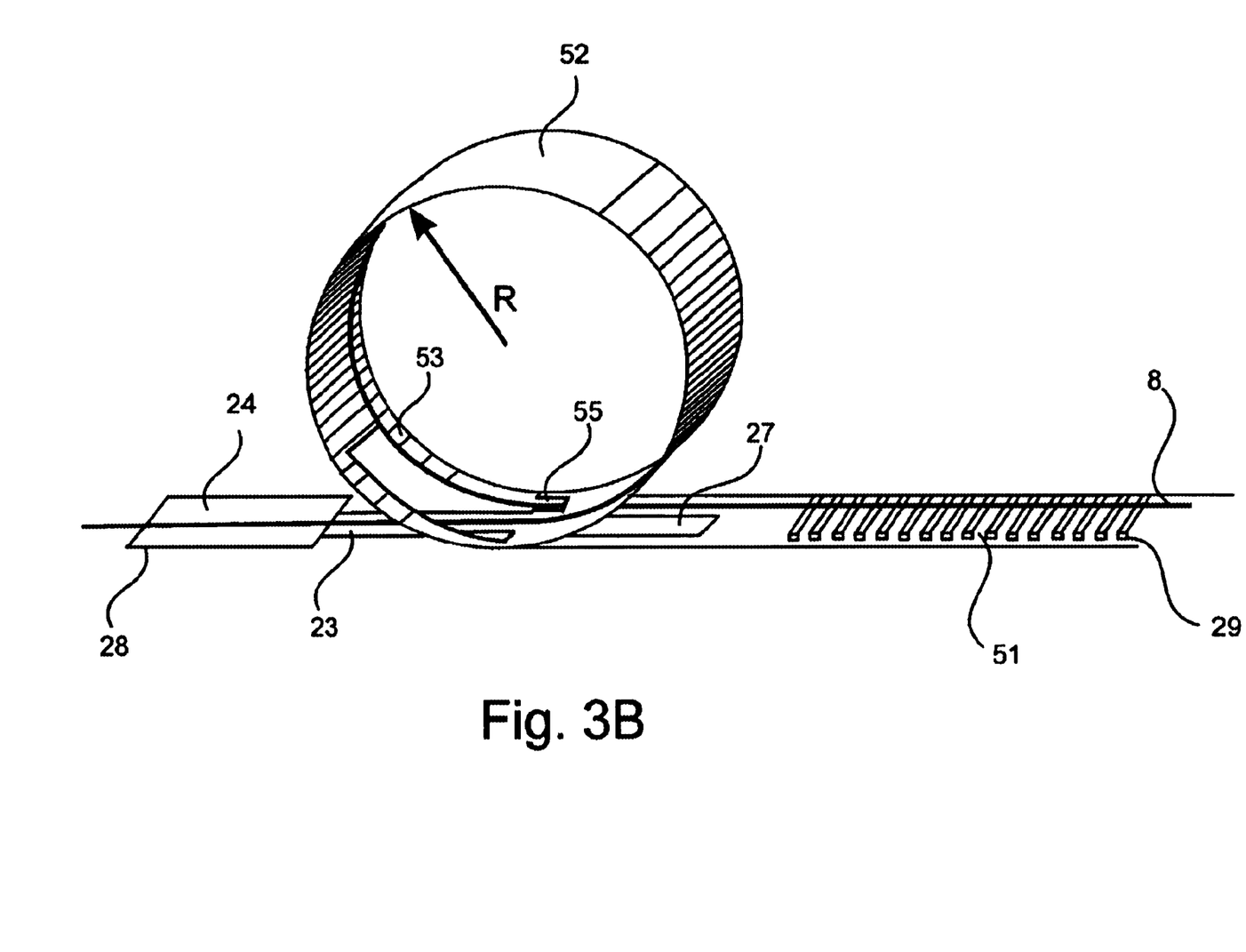

FIGS. 3A and B illustrate a loop device (20) for applying a uniform bend (with substantially constant R along the fiber grating length) to a layered substrate with embedded FBG of this invention. The substrate is bonded at its top or bottom surface (bonding to the bottom surface 59 as illustrated in FIG. 1E is exemplified) to a shaped strip of metal (e.g., spring steel) 25 with a tongue 26 comprising an arm 23 and a pad 24 wherein the arm is narrower than the pad and a slot 27 through which the tongue can be inserted to form the loop with two ends 28 and 29 extending from the loop as illustrated in FIG. 3B. As illustrated the arm 23 is narrower than the width of the slot 27 and the pad 24 is wider than the width of the slot, such that the tongue can be inserted through the slot to form a loop. The tongue, slot and pad can be of any shape and relative dimensions that allow the loop to be formed. The diameter (2R in FIG. 3B) of the loop can be changed by applying force to the ends of the looped strip. For example, one end 28 can be restrained and the other end 29 can be pulled to decrease the loop diameter. The diameter of the loop can be uniformly changed by use of a stepping motor (or similar device) appropriately connected to one or both loop ends to apply appropriate uniform force. One or both of the ends of the strip can be provided with holes, slots (e.g., 51) or other apertures or indentations in the strip at one or both ends for application of force to pull the ends of the strip. Slots (51) for engaging a driving gear of a stepping motor are illustrated in FIG. 3B.

In this design, the loop will have a maximum diameter that is defined by the length of the tongue and the slot. The loop will be held at its maximum diameter when the pad 24 of the tongue comes into contact with, put cannot pass through slot 27. Force applied to the ends of the looped strip decreases the diameter to a minimum diameter which is defined by the spacing (C) between arm 23 and slot 27. Spacing C is the circumference of the loop at its smallest diameter. Those of ordinary skill in the art will appreciate that the minimum and maximum diameters of looped device of FIG. 3B can be adjusted by selecting C, and the lengths of the slot and the arm. It will also be recognized that the metal, plastic or other material employed for the strip is preferably sufficiently elastic and resilient such that when forces on the ends of the strip are released that the loop will expand to its maximum diameter.

As illustrated in FIG. 3A, a layered substrate of any of FIGS. 1A–1K above is bonded to the surface of the shaped strip 25. It is preferred that the substrate is bonded along its entire length to the shaped strip and that the substrate is bonded such that it is substantially centered between slot 27 and arm 23. The substrate can be attached to either the outer (52) or inner (53) surface of the loop (see FIG. 3B), but is preferably bonded to the inner surface so that the fiber is compressed when the diameter of the loop is decreased. A notch (55) is optionally provided in the loop to allow the fiber to conveniently exit the loop. The minimum circumference of the loop C is larger than the length of the substrate and typically the loop will be range from about 1.5 to about 3 times the length of the substrate. The relative lengths of C and the substrate and the length of arm 23 can be selected to achieve a desired maximum and minimum bend radius R as will be appreciated by those in the art.

Figure 4A:
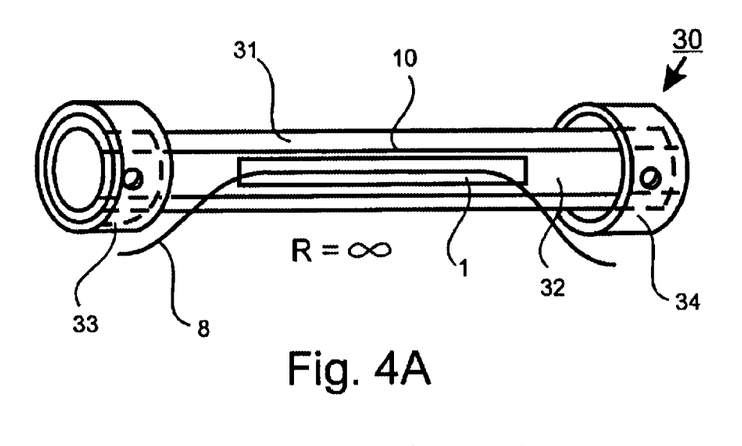
FIGS. 4A and 4B illustrate another device for bending a layered substrate comprising an FGB. The substrate is bent by uniform winding around a central cylinder or rod.
Figure 4B:
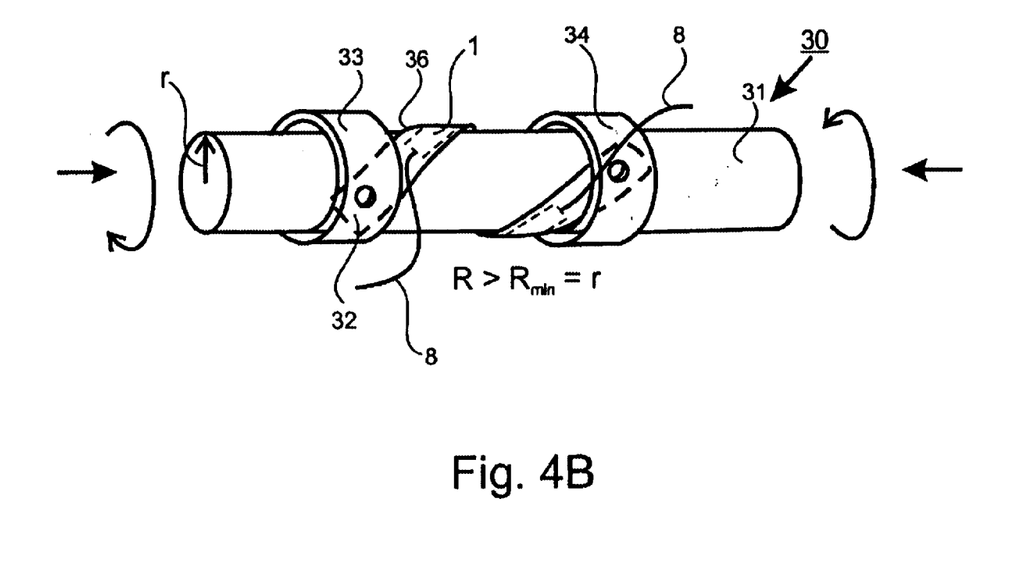

Another device for bending the layered substrate of this invention is illustrated schematically in FIGS. 4A and B. The substrate 1 in this device 30 is bent by winding it uniformly around a central cylinder (or rod) 31. A strip of metal or other elastic and resilient material 32 (a winding strip) is attached at either end to an element that can be moved along the rod to wind the winding strip around the rod, e.g., a ring (33 and 34). The moveable winding elements (e.g., 33 and 34) have an aperture that is sized to closely fit around rod 31 and with application of force can smoothly traverse the rod with the rod engaged in the aperture of the moveable element. The rod and moveable winding elements are preferably made of a nonelastic material that exhibits low surface friction, such as TEFLON (Trademark) or related materials.

The winding strip 32 is fastened, bonded or otherwise attached between the moveable winding elements and preferably on the inside surface of the elements with sufficient tension between the rods such that an inner surface 36 of the winding strip contacts the surface of rod 31 as illustrated. Strip 32 is attached to the moveable elements which are mounted on the rod such that in a relaxed position as illustrated in FIG. 4A the strip is parallel to the long axis of the rod. In this relaxed position the radius of bending is infinite.

Substrate 1 is bonded, preferably along its entire length, to winding strip 32. The substrate can be bonded on the inner or outer surface (with respect to the rod) of the winding strip 32, but is preferably bonded to the inner surface of the strip in contact with the rod. The surface of the substrate in contact with the rod can be provided with a surface layer or surface treatment compatible with the surface of the rod that provides reduced friction.

The substrate is bent as illustrated in FIG. 4B by rotating the moveable winding elements, e.g., the rings, relative to each other to wind the winding strip around the rod. The winding elements may both be rotated in opposite directions with respect to each other or one ring can be held fixed while the other ring is rotated (either clockwise or counter with respect to it. The minimum radius of the bend approaches the radius of the rod.

The winding strip and the substrate attached to it should remain flush against the rod as the strip is wound around the rod. Optional force can be applied by a cover or a rod attachment element to keep the winding strip substantially in contact with the rod. For example, a guiding groove can be provided on the rod matching the winding path of the strip. An element extending from the winding strip or the substrate inserted and held in such a groove can be used to substantially maintain the strip and substrate in contact with the rod.

Any of the layered substrates of this invention as illustrated in FIGS. 1A–1K can be employed in combination with tuning mechanisms illustrated in FIGS. 3A–B and 4A–B. In addition, fibers carrying a fiber grating and encased or embedded offset from the central axis of any of the substrates illustrated herein can also be combined with other devices known in the art for applying a force normal to the fiber axis such as exemplified in U.S. Pat. Nos. 6,240,220 and 5,007,705. For example, a substrate of this invention carrying a fiber having a fiber grating can be wound around the circumference of a piezoelectric cylinder, as illustrated in U.S. Pat. No. 5,007,705, and the grating can then be tuned by changing the diameter of the cylinder by appropriate application of voltage to the piezoelectric cylinder.

Those of ordinary skill in the art will appreciate that there are a variety of methods and materials other than those specifically disclosed herein that can be employed in view of the disclosures herein to achieve the goals of this invention. All methods and materials known in the art as functionally equivalent to the materials and methods herein are intended to be encompassed by this invention.

The tuning device and tunable FBG of this invention can be employed in a variety of optical sensing and communication devices for wavelength tuning and wavelength multiplexing and demultiplexing. The tunable FBG of this invention can be employed in any optical device that currently employs tunable wavelength filters, including without limitation, wavelength interrogators and discriminators, spectrometers and tunable lasers.

U.S. Pat. No. 6,044,189, Iocco, et al. J. Lightwave Technology 17(7):1999, K. O. Hill and G. Meltz, Fiber Bragg grating technology fundamentals and overview, J. Lightwave Technol., 15, 1997, G. A. Ball and W. W. Morey, Compression-tuned single-frequency Bragg grating fiber laser, Opt. Lett., 19, 1994, and A. Iocco, H. G. Limberger and R. P. Salathe, Tension and compression tuned Bragg grating filter, in Proc. ECOC 8, 1, 1999, are all incorporated by reference herein in their for descriptions of methods for wavelength tuning and temperature (tuning and compensation) of FBGs.

Those of ordinary skill in the art will appreciate that device elements, materials, procedures and methods other than those specifically described herein can be employed in the practice of this invention without resort to undue experimentation. All art-recognized functional equivalents of device elements, materials, procedures and methods that are specifically described herein are intended to be encompassed by this invention. All references cited herein are incorporated by reference herein to the extent that they are not inconsistent with the disclosures herein.

We claim:

1. A fiber grating tuning device which comprises:
   (a) a substrate having a longitudinal axis,
   (b) an optical fiber having a fiber grating therein which is longitudinally mounted upon or embedded within the substrate such that the fiber axis is offset from the plane of the longitudinal axis of the substrate; and
   (c) an actuator for application of force to the substrate to bend the substrate perpendicular to the longitudinal axis of the substrate and parallel to the direction the fiber axis is offset from the longitudinal axis of the substrate wherein the actuator comprises a loop having two ends wherein the diameter of the loop is changed by application of force to one or both ends of the loop.

2. The tuning device of claim 1 wherein the substrate comprises two or more layers of different materials and the fiber is embedded between two layers of the substrate.

3. The tuning device of claim 2 wherein the fiber is embedded between two layers of the substrate and within a layer of adhesive.

4. The tuning device of claim 1 wherein the fiber is mounted upon a surface of the substrate in an adhesive layer.

5. The tuning device of claim 1 wherein the substrate comprises two or more layers of different materials.

6. The tuning device of claim 1 wherein force applied to the substrate by the actuator is applied normal to the axis of the fiber.

7. The tuning device of claim 1 wherein the forces applied by the actuator are such that the substrate is bent uniformly along the length of the fiber grating on or within the substrate.

8. The tuning device of claim 1 wherein the loop has an outside surface and an inside surface and the substrate is mounted on a surface of the loop.

9. The tuning device of claim 8 wherein the substrate is mounted on the inside surface of the loop.

10. The tuning device of claim 8 wherein the substrate is mounted on the outside surface of the loop.

11. A fiber grating tuning device which comprises:
   (a) a substrate having a longitudinal axis,
   (b) an optical fiber having a fiber grating therein which is longitudinally mounted upon or embedded within the substrate such that the fiber axis is offset from the plane of the longitudinal axis of the substrate; and
   (c) an actuator for application of force to the substrate to bend the substrate perpendicular to the longitudinal axis and parallel to the direction the fiber axis is offset from the longitudinal axis of the substrate wherein the actuator is a cylindrical piezoelectric transducer upon which the substrate is mounted.

12. The tuning device of claim 11 wherein the actuator comprises a cylinder upon which the substrate is mounted in a relaxed or unbent state such that the substrate longitudinal axis is parallel to the longitudinal axis of the cylinder and wherein a bend is applied to the substrate by winding the substrate around the cylinder.

13. The tuning device of claim 12 wherein the substrate is bonded along its length to a winding strip.

14. The tuning device of claim 13 wherein the winding strip has two longitudinal ends each of which is attached to a rotating element which can be rotated around the cylinder and wherein the winding strip is wound around the cylinder by rotating the rotating elements at either end of the winding strip in opposite directions around the cylinder.

15. A method for tuning a fiber grating which comprises the steps of:
   (a) longitudinally mounting a fiber carrying a fiber grating on a substrate or longitudinally embedding a fiber carrying a fiber grating within a substrate such that the fiber axis is offset from the longitudinal axis of the substrate; and
   (b) bending the substrate perpendicular to the longitudinal axis of the substrate and parallel to the direction that the fiber axis is offset from the longitudinal axis of the substrate wherein a uniform bend is applied to the substrate by changing the diameter of a loop or cylinder to which the substrate is attached.

16. The method of claim 15 wherein the substrate comprises two or more layers of different materials and the fiber is embedded between two the layers of the substrate.

17. The method of claim 15 wherein the fiber is mounted on a surface of the substrate in a layer of adhesive.

18. The method of claim 15 wherein the uniform bend is applied to the substrate such that the radius of the bend is constant along the length of the fiber grating within the substrate.

* * * * *